United States Patent
Hokkirigawa et al.

(12)
(10) Patent No.: US 6,494,928 B1
(45) Date of Patent: Dec. 17, 2002

(54) POLISHING COMPOUND FOR SHEET METAL COATING

(75) Inventors: Kazuo Hokkirigawa, Yonezawa (JP); Motoharu Akiyama, Nagano-ken (JP); Noriyuki Yoshimura, Nagano-ken (JP)

(73) Assignee: Minebea Co., Ltd., Nagano-ken (JP)

( * ) Notice: Subject to any disclaimer, the term of this patent is extended or adjusted under 35 U.S.C. 154(b) by 0 days.

(21) Appl. No.: 10/154,792

(22) Filed: May 24, 2002

(30) Foreign Application Priority Data

May 25, 2001 (JP) ........................................ 2001-157523

(51) Int. Cl.⁷ .............................. C09K 3/14; C09G 1/02
(52) U.S. Cl. .............................. 51/303; 51/307; 51/308; 51/309; 51/298; 106/3; 106/5; 510/395; 510/397
(58) Field of Search .......................... 51/307, 308, 309, 51/298, 303; 106/3, 5; 510/395, 397

(56) References Cited

PUBLICATIONS

Development of Hard and Porous Carbon Material "RB Ceramics" Using Rice Bran as a Starting Material, Kazuo Hokkirigawa, vol. 17, No. 6, pp. 24 to 27, May 1997.

*Primary Examiner*—Michael Marcheschi
(74) *Attorney, Agent, or Firm*—Flynn, Thiel, Boutell & Tanis, P.C.

(57) ABSTRACT

There is provided a polishing compound for sheet metal coating comprising an polishing material and a surfactant in which a RB ceramics and/or CRB ceramics powder is used at least as a part of the polishing material, thereby shortening a stain removing process of a coated surface in reparative sheet metal coating work of cars, etc. without conducting a washing process thereafter.

7 Claims, No Drawings

POLISHING COMPOUND FOR SHEET METAL COATING

FIELD OF THE INVENTION

This invention relates to a polishing compound for sheet metal coating and more particularly relates to a polishing compound for sheet metal coating for removing stains on a coated surface and simultaneously washing the surface in reparative sheet metal coating work of cars, etc. and other similar operation.

BACKGROUND OF THE INVENTION

Conventional reparative sheet metal coating work of cars, etc. is carried out by removing stains with polishing materials such as polishing grains, paper, etc. and then washing and degreasing a coated surface by means of toweling, cotton cloth and other rags saturated with a degreasing agent, followed by face coating.

However, it has been imperfect and taken a long time for these conventional polishing materials to abrade the surface and sometimes difficult to wash out wax or oily dirt from hands completely, although stains of ordinary dirt or dust can be removed.

Such wax or oily dirt from hands still sticks on the coated surface even after a stain removing process with conventional polishing materials and thus should be washed out additionally.

Inferiority in adhesion, scaling, peeling, blister and the like would be resulted in after coating, if the above mentioned additional wash-out process is neglected. This is the reason why the conventional stain removing work takes a long time including the indispensable process to wash out and degrease the coated surface with a degreasing agent after the polishing process is finished, which causes a problem of lowering efficiency in the reparative sheet metal coating work.

SUMMARY OF THE INVENTION

Accordingly, it is an object of the present invention to provide a polishing compound for sheet metal coating in reparative sheet metal coating work of cars, etc., which shortens a stain removing process of a coated surface without conducting a wash-out process thereafter.

The inventors have eagerly investigated and found that the above mentioned problem can be solved by using RB ceramics and/or CRB ceramics at least partially as an polishing material for a polishing compound for sheet metal coating and further formulating the ceramics in a detergent. The present invention has been developed on the basis of this fact.

PREFERRED EMBODIMENTS OF THE INVENTION

RB ceramics used in the present powder detergent is a powder of RB ceramics or CRB ceramics formed by grinding these ceramics to particles of 1 to 1000 $\mu$m.

Each material of RB ceramics and CRB ceramics used in the present invention is prepared by the following manner.

As is known, Dr. Kazuo Hokkirigawa, the first inventor of the present invention, proposed an idea to obtain a porous carbon material by the use of rice bran which is by-produced 0.9 million ton/year in Japan or 33 million ton/year in the world (see, Kinou Zairyou, Vol. 17, No. 5, pp. 24 to 28, May 1997).

The above mentioned literature describes a method for preparing a carbon material or so-called RB ceramics by mixing and kneading a defatted product of rice bran and a thermosetting resin, press-molding the mixture to form a molded material, drying and then baking the dried material in an atmosphere of inert gas.

Defatted rice bran used in the present invention is not limited to a specific species of rice and may either be a product of Japan or foreign countries.

A thermosetting resin used herein may also be any resin which can be thermally set and typically includes phenol-, diarylphthalate-, unsaturated polyester-, epoxy-, polyimide- and triazine resins, although a phenol resin is preferably used.

A thermoplastic resin such as polyamide may also be used together without departing from a scope of the present invention.

A mixing ratio of the defatted rice bran to the thermosetting resin is in the range of 50 to 90:50 to 10 and preferably 70 to 80:30 to 20 in by weight.

According to the above mentioned method, difference in ratio of shrinkage between the press-molded material and the finally molded material which is baked in an atmosphere of inert gas reached almost 25%. Such a difference made it substantially difficult to form a precisely molded material, but has been finally improved as a result of development of CRB ceramics.

CRB ceramics used in the present invention is an improved material of RB ceramics obtained from defatted rice bran and a thermosetting resin. The defatted product of rice bran and the thermosetting resin are mixed and kneaded, primarily baked in an inert gas at 700 to 1,000° C. and ground to form a carbonated powder of about 60 mesh or less. The powder is then mixed and kneaded with the thermosetting resin, press-molded at a pressure of 20 to 30 Mpa and heat-treated again in an atmosphere of inert gas at 100 to 1,100° C. to form CRB ceramics as a black resin or porous product.

General properties of RB ceramics and CRB ceramics are as in the following:

extremely high hardness;

oil absorptive;

extremely small heat expansion coefficient;

porous structure;

electrical conductivity;

low specific gravity, light weighted;

improved abrasion resistance;

easiness of molding and mold die making;

capable of being powdered; and less negative effect to global environment and more resource conservation due to rice bran to be used a s a starting material.

The most typical distinction of RB ceramics and CRB ceramics is that a difference in ratio of shrinkage between molded RB ceramics and a final product thereof is almost 25%, while that of CRB ceramics is so low as 3% or less, which makes the latter material much useful. However, such distinction between them is not important in the present invention, because the final product is formed not as a molded material but as a powder. So, either of RB ceramics or CRB ceramics may basically be used in the present invention.

Hardness is an important factor of RB ceramics and/or CRB ceramics used in the present invention, which is influenced by the primary baking temperature of RB ceramics and both of the primary baking temperature and the secondary heat-treating temperature of CRB ceramics.

In general, the primary baking and the secondary heat treatment at a temperature of 500 to 1,000° C. yield RB ceramics or CRB ceramics of high hardness.

Particle size of a RB ceramics or CRB ceramics powder may vary depending on the purpose to be used but usually in the range of 1 to 1,000 μm in average particle diameter, although, in general, a powder of a larger particle diameter is applied to a coarse surface and smaller one to a smooth surface.

Well-known polishing materials which may be used in combination with RB ceramics and/or CRB ceramics in the present invention include diatomaceous earth, pumice powder, alumina, silica, calcium oxide, silicon nitride, silicon carbide, cesium oxide, synthetic or natural diamond, metal silicide, tungsten oxide, titanium nitride, titanium oxide and the like.

It is preferable to use diatomaceous earth and pumice powder as a natural polishing material; or an alumina polishing material such brown-, white-, pale red- and crushed type alumina polishing material, and a silicon carbide grinding material such as black- and green silicon carbide grinding material as a synthetic one. These polishing or grinding materials may be used alone or in combination with two or more of them.

A combining ratio of these materials may vary depending on the purpose to be used and, in general, 30 to 90 parts by weight of a RB ceramics and/or CRB ceramics powder is combined with 70 to 10 parts by weight of one or not less than two kinds of powders selected from a group consisting of silica, calcium oxide, aluminum oxide, silicon nitride, silicon carbide, cesium oxide, natural or synthetic diamond, metal silicide, tungsten oxide, titanium nitride and titanium oxide.

A detergent used in the present invention is selected from annionic surfactant, amphoteric surfactant, nonionic surfactant or cationic surfactant and the like.

The anionic surfactant includes, for example, a fatty acid salt such as potassium laurate, potassium myristate and potassium oleate; an alkyl sulfate such as sodium laurylsulfate, ammonium laurylsulfate and lauryl sulfate triethanolamine; alkylbenzene-sulfonate such as sodium dodecylbenzenesulfonate; a N-acylamino acid salt such as lauroylsarcosine sodium salt and lauroylsarcosine potassium salt; an alkyl ether carbonate such as polyoxyethylene dodecyl ether sodium acetate; a N-acyl taurine salt such as N-lauroyl-methyltaurine sodium salt and N-cocoylmethyltaurine sodium salt; a N-acylalnine salt such as lauroylalanine sodium salt; a sulfonate such as sodium laurylsulfoacetate; polyoxyethylene alkyl ether sulfuric acid ester salt such as sodium polyoxyethylene lauryl ether sulfate and poloyoxyethylene lauryl ether sulfuric acid triethanolamine; an alkanesulfonate such as sodium tetradecanesulfonate and sodium pentadecanesulfonate; an α-olefinic sulfonate such as sodium tetradecenesulfonate; an alkylphosphate such as sodium laurylphosphate; a polyoxyethylene lauryl ether phosphate such as sodium polyoxyethylene lauryl ether phosphate and the like.

The amphoteric surfactant includes, for example, an acetic acid betain type surfactant such as lauryldimethylaminoacetic acid betain, lauric acid amide propyldimethylaminoacetic acid betain and coconut oil fatty acid amide propyldimethyl-aminoacetic acid betain; and an imidazoline type surfactant such as N-coconut oil fatty acid acyl-N-carboxymethyl-N-hydroxyethylenediamine sodium salt.

The nonionic surfactant includes, for example, a polyoxyethylene alkyl ether such as polyoxyethylene lauryl ether; and an alkyl alkanolamide.

The cationic surfactant includes, for example, an alkylammonium salt such as lauryltrimethylammonium chloride; and an lauryldimethylamine oxide.

An amount of the detergent to be added is preferably 1 to 30 parts by weight per 100 parts by weight of the polishing material.

An amount thereof less than 1 part by weight results in too weak detergency to wash out wax and dirt from hands sufficiently, while the amount of more than 30 parts by weight lowers rinsing efficiency and is not preferable from an economical viewpoint.

The detergent may either be used alone or in combination of two or more.

The present polishing compound for sheet metal coating may be compounded by mixing an polishing material and a surfactant in the following two manners.

In one type, a polishing material is dispersed in an aqueous solution of detergent to form a polishing compound for sheet metal coating of adequate viscosity in a state of paste or liquid depending on an amount of water to be added to the detergent. When the liquid or pasty polishing compound for sheet metal coating is used in practice, the polishing material and the detergent are thoroughly mixed by shaking a container containing the compound sufficiently to apply by means of rag or other waste cloth soaked therewith.

In the other type, a detergent and a powdery polishing material are mixed and solidified with a binder. When the thus formed solid compound is used in practice, the compound is soaked in a solvent such as water which dissolves the binder, and applied to a surface to be coated by scoring thereon, thereby the coated surface being abraded and washed.

A binder used in the present invention includes carboxymethyl cellulose (CMC), polyvinyl alcohol (PVA), starch, alcohol soluble polyamide, etc. In particular, carboxymethyl cellulose (CMC), polyvinyl alcohol (PVA) and starch are a water soluble high polymer and preferably used in the present invention.

The present invention will be summarized as in the following.

1. A polishing compound for sheet metal coating comprising a polishing material and a detergent in which a RB ceramics and/or CRB ceramics powder is used at least as a part of the polishing material.

2. A polishing compound for sheet metal coating described in the above item 1 in which an polishing material is one or not less than two kinds of powders selected from a group consisting of diatomaceous earth, pumice powder, alumina, silica, calcium oxide, silicon nitride, silicon carbide, cesium oxide, synthetic or natural diamond, metal silicide, tungsten oxide, titanium nitride and titanium oxide.

3. A polishing compound for sheet metal coating described in the above item 2 in which an polishing material comprises a RB ceramics and/or CRB ceramics powder and one or not less than two kinds of powders selected from a group consisting of silica, calcium oxide, aluminum oxide, silicon nitride, silicon carbide, cesium oxide, synthetic or natural diamond, metal silicide, tungsten oxide, titanium nitride and titanium oxide, in a weight ratio of 30 to 90:70 to 10, respectively.

4. A polishing compound for sheet metal coating described in any one of the above items 1 to 3 in which an average particle diameter of RB ceramics and/or CRB ceramics powder is 1 to 300 μm.

5. A polishing compound for sheet metal coating described in any one of the above items 1 to 4 in which a detergent is one or not less than two surfactants selected from a group consisting of an anionic surfactant, amphoteric surfactant, nonionic surfactant or cationic surfactant.

6. A polishing compound for sheet metal coating described in any one of the above items 1 to 5 in which an polishing material and a detergent are solidified with a binder.

7. A polishing compound for sheet metal coating described in the above item 6 in which a binder is a water soluble polymer.

As has been described above, the present invention provides a polishing compound for sheet metal coating in reparative sheet metal coating work of cars, which shortens a stain removing process of a coated surface without conducting a cleaning process thereafter in reparative sheet metal coating work of cars, etc. by using an environmentally acceptable material of RB ceramics and/or CRB ceramics as an polishing material.

Further, as RB ceramics and/or CRB ceramics is a black material, its residue on the abraded surface is quite noticeable, if any, and is useful as an indicator of surface washing with water.

The present invention will be further described by the following examples.

EXAMPLE 1
Preparation of CRB Ceramics

A defatted product of rice bran in an amount of 75 kg and a liquid phenol resin (resol) in an amount of 25 kg were mixed and kneaded by heating at 50 to 60° C. to form a plastic and homogeneous mixture.

The mixture was primarily baked by means of a rotary kiln in a nitrogen atmosphere at 900° C. for 60 minutes. The thus baked and carbonized material was screened through a 100-mesh screen to obtain a carbonized powder of 50 to 250 μm in particle diameter.

The carbonized powder in an amount of 75 kg and a solid phenol resin (resol) in an amount of 25 kg were mixed and kneaded by heating at 100 to 150° C. to form a plastic and homogeneous mixture.

Preparation of Polishing Material

Then, the plastic mixture was press-molded at a pressure of 20 Mpa to form a spherical body of 3 cm in diameter. The mold die temperature was 150° C.

The thus molded body was taken out of the mold die and subjected to a heat treatment by heating-up to 500° C. in a nitrogen atmosphere at a heat rising rate of 1° C. per minute, keeping at 500° C. for 60 minutes and then baking 900° C. for 120 minutes.

The molded body was then cooled at a cool down rate of 2 to 3° C. per minute down to at 500° C., followed by natural heat dissipation under 500° C.

The spherical body of 3 cm in diameter was ground by a grinder and further pulverized by a ball mill to form CRB ceramics primary particles of 5 to 10 μm in average particle diameter.

Preparation of Polishing Compound for Sheet Metal Coating

Primary fine particles of CRB ceramics having an average particle diameter of 5 μm in an amount of 2 kg, 2.5 kg of water and 0.5 kg of potassium laurate were mixed at room temperature and further treated by means of a roll mill to yield a homogeneously slurried polishing compound for sheet metal coating.

Polishing Process and Coating

The slurried polishing compound for sheet metal coating was brought to an polishing and washing site and impregnated into rags to carefully rub a flawed car surface to be coated. When the flawed surface was smoothened, the surface was washed with water and dried. After confirming the absence of oil film on the surface, a commercially available paint was sprayed thereon several times to the sheet metal coating. Inferior in adhesion, scaling, peeling, blister and other defects were not observed after the coating process.

EXAMPLE 2
Preparation of CRB Ceramics

A defatted product of rice bran in an amount of 75 kg and a liquid phenol resin (resol) in an amount of 25 kg were mixed and kneaded by heating at 50 to 60° C. to form a plastic and homogeneous mixture.

The mixture was primarily baked by means of a rotary kiln in a nitrogen atmosphere at 900° C. for 60 minutes. The thus baked and carbonized material was screened through a 100-mesh screen to obtain a carbonized powder of 50 to 250 μm in particle diameter.

The carbonized powder in an amount of 75 kg and a solid phenol resin (resol) in an amount of 25 kg were mixed and kneaded by heating at 100 to 150° C. to form a plastic and homogeneous mixture.

Preparation of Polishing Material

Then, the plastic mixture was press-molded at a pressure of 20 Mpa to form a spherical body of 3 cm in diameter. The mold die temperature was 150° C.

The thus molded body was taken out of the mold die and subjected to a heat treatment by heating-up to 500° C. in a nitrogen atmosphere at a heat rising rate of 1° C. per minute, keeping at 500° C. for 60 minutes and then baking 850° C. for 120 minutes.

The molded body was then cooled at a cool down rate of 2 to 3° C. per minute down to at 500° C., followed by natural heat dissipation under 500° C.

The spherical body of 3 cm in diameter was ground by a grinder and then screened through a 300-mesh screen to form CRB ceramics primary particles of 50 to 80 μm in average particle diameter.

Preparation of Polishing Compound for Sheet Metal Coating

Primary fine particles of CRB ceramics having an average particle diameter of 70 μm in an amount of 2 kg, 0.5 kg of powdery silica having an average particle diameter of 10 μm, 2.5 kg of water and 0.5 kg of potassium laurate were mixed at room temperature while further stirring to yield a homogeneously slurried polishing compound for sheet metal coating.

Polishing Process and Coating

The slurried polishing compound for sheet metal coating was brought to an polishing and washing site and impregnated into rags to carefully rub a flawed car surface to be coated. When the flawed surface was smoothened, the surface was washed with water and dried. After confirming the absence of oil film on the surface, a commercially available paint was sprayed thereon several times to the sheet metal coating. Inferior in adhesion, scaling, peeling, blister and other defects were not observed after the coating process.

EXAMPLE 3
Preparation of RB Ceramics

A defatted product of rice bran in an amount of 75 kg and a liquid phenol resin (resol) in an amount of 25 kg were mixed and kneaded by heating at 50 to 60° C. to form a plastic and homogeneous mixture.

The mixture was primarily baked by means of a rotary kiln in a nitrogen atmosphere at 900° C. for 80 minutes. The thus baked and carbonized material was screened through a 100-mesh screen to obtain a carbonized powder of 50 to 250 μm in particle diameter.

Preparation of Polishing Material

The carbonized powder was further pulverized by a ball mill to form RB ceramics primary fine particles of 30 to 40 μm in average particle diameter.

Preparation of Polishing Compound for Sheet Metal Coating

Primary fine particles of RB ceramics having an average particle diameter of 30 μm in an amount of 2 kg, 1 kg of powdery alumina having an average particle diameter of 5 μm, 3.0 kg of water and 0.5 kg of potassium laurate as an anionic surfactant were mixed at room temperature and further treated by means of a roll mill to yield a homogeneously slurried polishing compound for sheet metal coating.

Polishing Process and Coating

The slurried polishing compound for sheet metal coating was brought to an polishing and washing site and impregnated into rags to carefully rub a flawed car surface to be coated. When the flawed surface was smoothened, the surface was washed with water and dried. After confirming the absence of oil film on the surface, a commercially available paint was sprayed thereon several times to the sheet metal coating. Inferior in adhesion, scaling, peeling, blister and other defects were not observed after the coating process.

EXAMPLE 4

Preparation of RB Ceramics

A defatted product of rice bran in an amount of 75 kg and a liquid phenol resin (resol) in an amount of 25 kg were mixed and kneaded by heating at 50 to 60° C. to form a plastic and homogeneous mixture.

Preparation of Polishing Material

The mixture was primarily baked by means of a rotary kiln in a nitrogen atmosphere at 900° C. for 70 minutes. The thus baked material was screened through a 60-mesh screen to obtain a carbonized powder of 200 to 400 μm in particle diameter, which was further pulverized by means of a ball mill to form primary fine particles of RB ceramics having an average particle diameter of 100 to 200 μm.

Preparation of Polishing Compound for Sheet Metal Coating

Primary fine particles of RB ceramics having an average particle diameter of 150 μm in an amount of 2 kg, 1kg of powdery alumina having an average particle diameter of 5 μm, 1.5 kg of water and 0.5 kg of potassium laurate as an anionic surfactant were mixed at room temperature and further added with 0.5 kg of carboxymethyl cellulose (CMC) to form a plastic composition. The plastic composition was molded into a cylindrical body of 3 cm in diameter and 15 cm in height, which was dried to form a molded polishing compound for sheet metal coating.

Polishing Process and Coating

The molded polishing compound for sheet metal coating was brought to an polishing and washing site and soaked with water to directly and carefully rub a rusted and flawed car surface to be coated. As a result, the rust was completely removed. When the flawed surface was smoothened, the surface was washed with water and dried. After confirming the absence of oil film on the surface, a commercially available paint was sprayed thereon several times to the sheet metal coating. Inferior in adhesion, scaling, peeling, blister and other defects were not observed after the coating process.

What is claimed is:

1. A polishing compound for sheet metal coating comprising a polishing material and a detergent in which a RB ceramics and/or CRB ceramics powder is used at least as a part of the polishing material.

2. A polishing compound for sheet metal coating claimed in claim 1 in which the polishing material comprises RB ceramics and/or CRB ceramics powder and one or more powders selected from a group consisting of diatomaceous earth, pumice powder, alumina, silica, calcium oxide, silicon nitride, silicon carbide, cesium oxide, synthetic or natural diamond, metal silicide, tungsten oxide, titanium nitride and titanium oxide.

3. A polishing compound for sheet metal coating claimed in claim 2 in which the polishing material comprises a RB ceramics and/or CRB ceramics powder and one or more powders selected from a group consisting of silica, calcium oxide, aluminum oxide, silicon nitride, silicon carbide, cesium oxide, synthetic or natural diamond, metal silicide, tungsten oxide, titanium nitride and titanium oxide, in a weight ratio of 30 to 90:70 to 10, respectively.

4. A polishing compound for sheet metal coating claimed in claim 1 in which an average particle diameter of RB ceramics and/or CRB ceramics powder is 1 to 1,000 μm.

5. A polishing compound for sheet metal coating claimed in claim 1 in which the detergent comprises at least one surfactant selected from a group consisting of an anionic-, amphoteric surfactant, nonionic surfactant and cationic surfactant.

6. A polishing compound for sheet metal coating claimed in claim 1 in which the polishing material and the detergent are solidified with a binder.

7. A polishing compound for sheet metal coating claimed in claim 6 in which the binder is a water soluble polymer.

* * * * *